Aug. 7, 1956 — K. FRANCK — 2,758,200
LIGHT TRANSMITTERS AND DIFFUSERS
Filed July 22, 1950 — 4 Sheets-Sheet 2
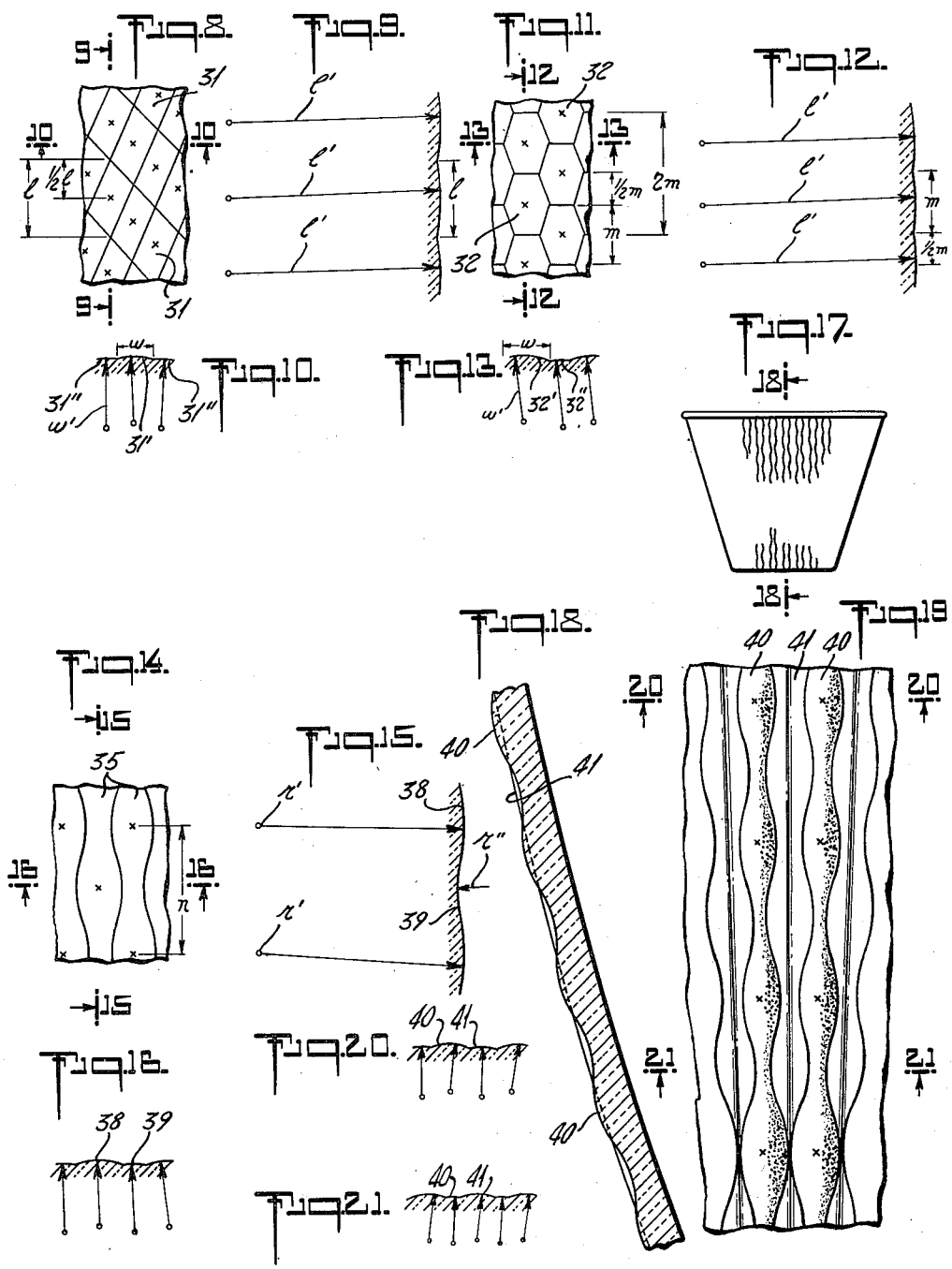
INVENTOR
KURT FRANCK
BY
ATTORNEY

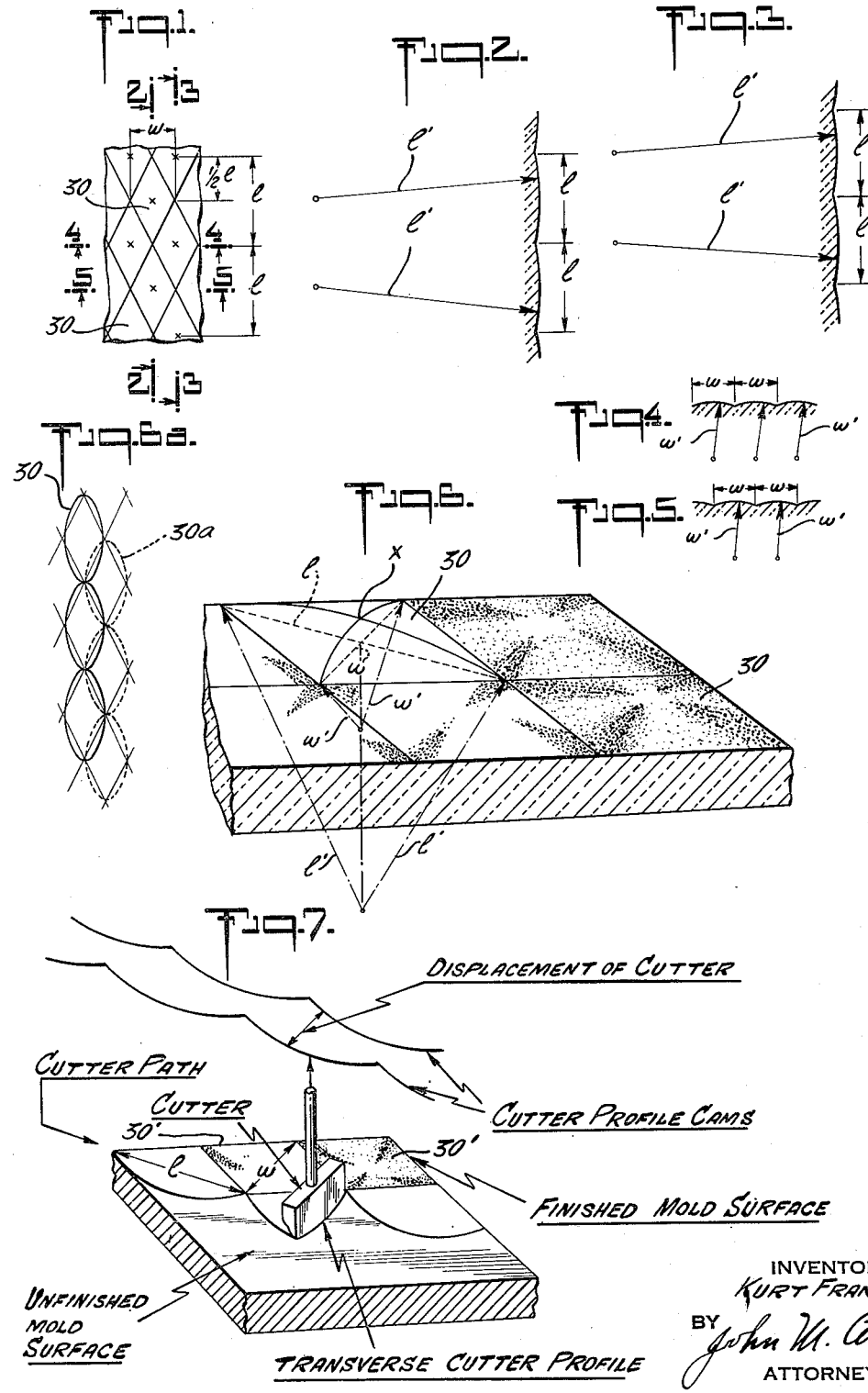

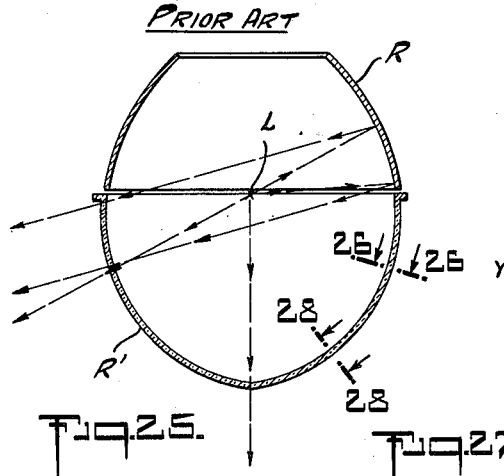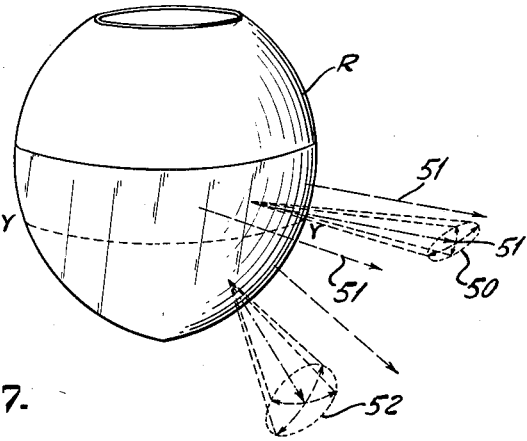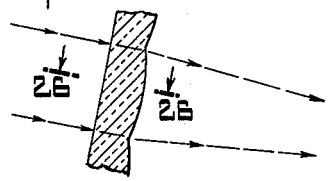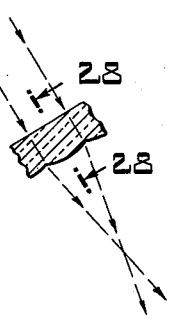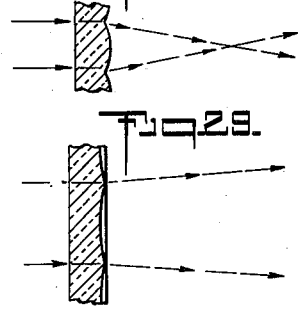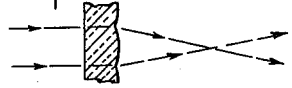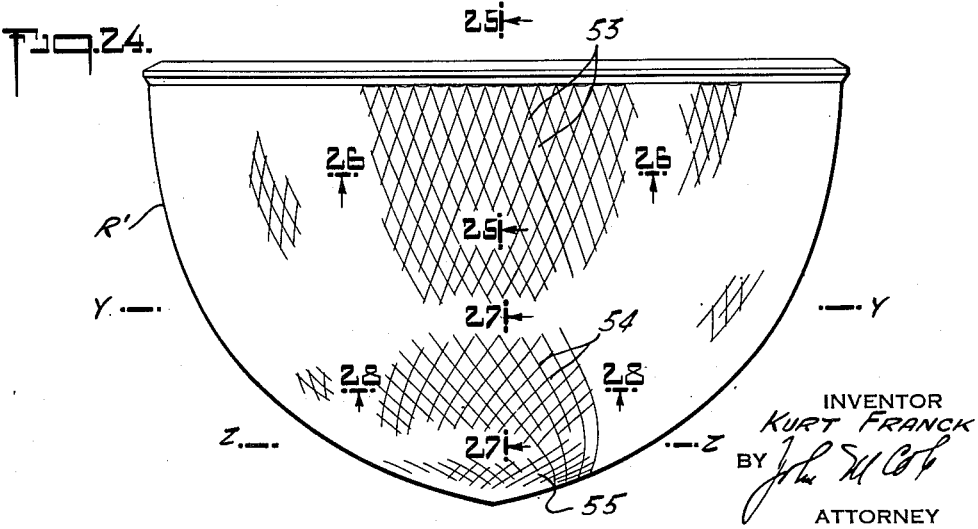

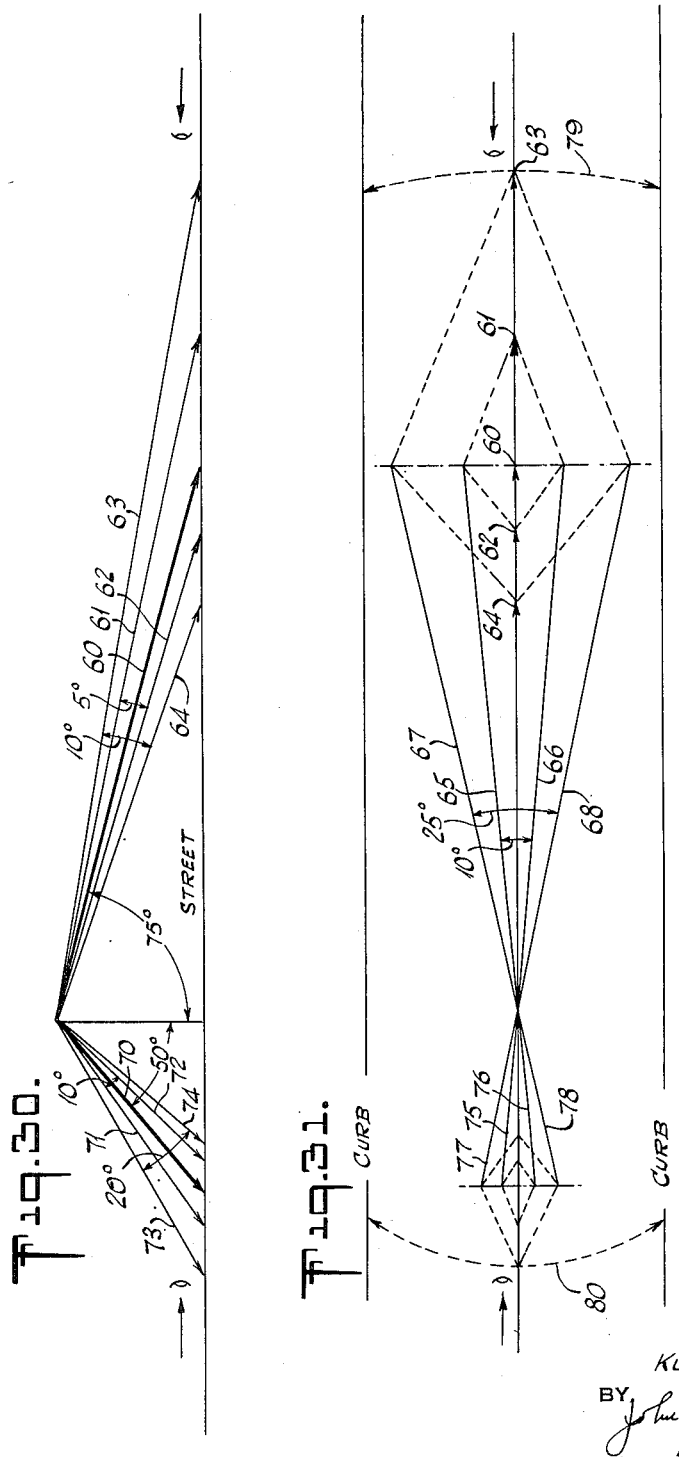

United States Patent Office 2,758,200
Patented Aug. 7, 1956

2,758,200
LIGHT TRANSMITTERS AND DIFFUSERS

Kurt Franck, Newark, Ohio, assignor to Holophane Company, Inc., New York, N. Y., a corporation of Delaware Application July 22, 1950, Serial No. 175,307

4 Claims. (Cl. 240—106)

The present invention relates to light transmitters and diffusers and is more particularly directed toward light transmitters and diffusers for use in luminaires having light controlling means for directing beams of high intensity through the light transmitter in predetermined directions for illumination purposes and wherein limited diffusion of the rays is desired to eliminate streaks in the light pattern and smoothen it out, also to obscure the source against direct observation and enlarge or spread out the apparent size of the source of light rays to reduce brightness contrasts.

The invention is particularly applicable for use on street lighting refractors and similar refractors where the output of the lamp employed is concentrated by refracting and reflecting equipment into very intense beams. As such equipment emits light in all azimuths, or is viewed in all directions, the diffusing means employed should be in a form to occupy all of a large superficial area rather than mere spots, and it must have such limited diffusion as not to dissolve out the concentrated beam which the equipment is primarily intended to produce.

Heretofore various diffusing figurations have been employed for these purposes, for example:

(1) Etching, which must be done on each piece produced, which varies from piece to piece, and in any piece is uniformly diffusing in all directions;

(2) Rectilinear mold-produced flutes of uniform cross-section;

(3) Mold-produced waves, wiggles, ripples, pyramidal diamond-like patterns, and the like.

The making of molds to produce such figurations directly in the piece is an involved and expensive procedure. Of those mentioned, only part of the rectilinear flutes can ordinarily be produced by machined mold surfaces. Some of these flutes, as well as the other figurations, are available only in mold equipment in which the pattern has been hand chipped into the mold or plunger. Such operations are very expensive, liable to ruin the mold and cannot be precisely reproduced in a new mold.

The present invention contemplates the provision of light transmitting equipment with diffusing figurations which provide controlled diffusion in directions at right angles to one another, with variation in the amount of diffusion one way or the other way in different regions of the area being treated. All these figurations are obtainable from mold equipment, whose surfaces are of precise design throughout, made by accurately controlled tools and capable of reproduction whenever desired.

The simple, straight, symmetric convex or concave flute has the property of laterally diffusing light to one side or the other of a median plane through the center of the flute. Such a flute produces no diffusion longitudinally of the flute. To produce diffusion in both directions by flutes, it has been customary to place crossing sets of flutes on opposite faces of the light transmitter, even though they tend to produce lens-like effects when viewed, and alternate light and dark rings in the illumination pattern. Such crossed flutes, however, cannot be employed where one surface is required for dominant control by refraction, and hence such expedients are not practical for street lighting refractors.

The present invention contemplates the provision of new forms of light diffusing flutes and new arrangements of such flutes, whereby controlled diffusion is to be had in both directions without producing lens effects or light and dark rings in the illumination pattern. The diffusion patterns are mixed up both vertically and horizontally so as to produce a very uniform appearance and light pattern, and at the same time distinctive appearances may be provided the refractors.

According to the present invention, the straight line or rectilinear characteristic of the flutes is retained and they are placed parallel with one another or in radial planes (on bowls and the like), but the longitudinal contour of the flutes is not uniform. Viewed transversely, the profile contour of the flute is a series of curves. Where the curves are externally convex, i. e. cusped, the high and low points of the adjacent flutes are staggered so that the summits of one flute are not opposite the summits of the other. In surface pattern, the flutes are separated by straight lines, for example, symmetric diamonds, asymmetric diamonds, or hexagons. Where, however, the flute has an ogee or sinuous profile, i. e., one made up of alternate convex and concave portions, the surface pattern is made up of a series of ogee or sinuous curves which are longitudinally displaced from one another and alternately converge and diverge.

While, in general, it is preferable to have the flutes of toroidal curvature either convex or concave immediately contiguous, or nested together, to produce the diamond, hexagon or sinuous patterns just referred to, it is possible to alternate such compound curvature flutes with single curvature flutes.

The accompanying drawings show, for purposes of illustrating the present invention, several embodiments in which the invention may take form, it being understood that the drawings are illustrative of the invention rather than limiting the same.

In the accompanying drawings:

Figure 1 is an elevational view showing one form of diffusing surface with symmetric, diamond-shaped diffusing elements or lenticulations;

Figures 2 and 3 are sectional views showing the cusped profile lengthwise of the diamonds and taken on the lines 2—2 and 3—3, respectively, of Figure 1;

Figures 4 and 5 are sectional views showing the profile transverse of the diamonds and taken on the lines 4—4 and 5—5, respectively, of Figure 1;

Figure 6 is a perspective view showing the surface with diamond-shaped diffusing elements or lenticulations of Figure 1;

Figure 6a is a view illustrating in elevation a single flute;

Figure 7 is a diagrammatic perspective view illustrating the formation of the mold for making the diffuser of Figures 1 to 6;

Figure 8 is a view similar to Figure 1 illustrating a diffuser with asymmetric, diamond-shaped diffusing elements;

Figures 9 and 10 are longitudinal and transverse sectional views showing profiles on the lines 9—9 and 10—10, respectively, of Figure 8;

Figure 11 is a view similar to Figures 1 and 8, showing diffusing elements of hexagonal configuration;

Figures 12 and 13 are longitudinal and transverse sections showing profiles on the lines 12—12 and 13—13, respectively, of Figure 11;

Figure 14 is a view similar to Figure 1 illustrating a diffusing pattern wherein the boundaries of the families of flutes are curves instead of straight lines;

Figures 15 and 16 are longitudinal and transverse sectional views showing profiles on the lines 15—15 and 16—16, respectively, of Figure 14;

Figure 17 is a side elevational view of a cone-shaped refractor employing a variation of the pattern of Figure 14;

Figure 18 is an enlarged sectional view on the line 18—18 of Figure 17;

Figure 19 is an elevational view of a portion of the refractor surface of Figure 17 on an enlarged scale;

Figures 20 and 21 are cross-sectional views on the lines 20—20 and 21—21, respectively, of Figure 19;

Figure 22 is a vertical sectional view through a prior art form of luminaire for street lighting illustrating a dominant light control;

Figure 23 is a perspective view illustrating the luminaire of Figure 22 and diagrammatically showing the light control effected by the diffusing elements;

Figure 24 is a side elevational view illustrating the refractor of Figures 22 and 23;

Figures 25 to 28, inclusive, are sectional views on the corresponding lines of Figures 22 and 24;

Figure 29 illustrates a toroidal concave lenticulation; and

Figures 30 and 31 are diagrammatic side elevation and plan views showing light distribution of the diffuser of Figure 8.

In Figures 1 through 6, the diffusing elements or lenticulations on the light emitting surface of the transparent member have a diamond-like pattern as will be obvious from Figure 1. The diamond-shaped areas 30 have a length $l$ and a width $w$. The surfaces are of toroidal contour with summits at the center of the diamonds, as indicated by an X. The radius of curvature in the long direction of the diamonds is indicated by $l'$ and the radius of curvature transversely is indicated by line $w'$. The profile is cusped. As will be apparent from Figures 1 to 6, each row of diamonds is shifted relative to the laterally adjacent row an amount equal to ½ $l$ so that the diamonds take up and occupy the entire superficial area under consideration.

In each diamond-shaped area is a small lens or lenticulation, the surface of which is a portion of a toroid, a chain of them taken along the long axis forming a single outwardly convex flute of alternately maximum and minimum (zero) widths with uniform transverse radius of curvature to accept a varying width light beam and diffusely transmit the same with uniform transverse diffusion and with a profile made up of a series of curves which provide lengthwise diffusion. As the adjacent flute, composed of the next row of diamonds nests with the first flute, diffusion patterns are displaced in regular fashion. If only a single isolated flute were involved, it would appear as in Figure 6a. Here a series of ellipses 30a define the outline of the separate lenticulations. These ellipses are cut back to diamonds in the making of the mold.

The diffusing surface made up of the diamond-shaped elements or lenticulations is obtained by using a mold of the proper configuration. This mold is diagrammatically illustrated in Figure 7. The corresponding diamond-shaped areas in the mold are designated 30' and the same reference characters $l$, $w$, $l'$, and $w'$ used for lengths and radii of curvature. The diamond-shaped depressions in the mold corresponding to the diamond-shaped bumps in the light transmitter are produced in the mold by machining the mold with a properly shaped cutter moved in the proper path. If, for example, one desires to create the series of depressions in the mold along the cutter path as indicated in Figure 7 and having the cusped longitudinal and transverse profiles, the cutter used has a transverse profile as indicated, corresponding with the radius of curvature $w'$. The cutter is actuated along the path, but instead of moving it in a line corresponding with the general profile of the surface being worked on (as would be the case were one to cut a uniform groove corresponding with the general profile to produce a contour for a uniformly diffusing flute), the cutter is moved along a cusped path indicated by the "cutter profile cams" in Figure 7. In this manner, the cutter is moved in and out along a cusped outline of the type shown in Figures 2 and 3 and cuts a series of elliptical depressions. After one such flute formation is made in the mold, this cutter is shifted and the cutter profile cam is displaced longitudinally one-half the length of the diamond-shaped lenticulation desired. The intersections of the cusped grooves thus produced, form a symmetrical diamond-shaped pattern when a series of the grooves are formed side by side.

It will be noted that it is possible in the manner above given to produce molding equipment (whether for molding glass or plastic), having a configuration in which all radii or curvature are precisely controlled, and it can be reproduced whenever desired.

In the arrangement shown in Figures 8, 9 and 10, the diffusing pattern is made up of asymmetric diamonds 31, which also occupy the entire area of the surface under consideration. Here the longitudinal section of Figure 9 is similar to the longitudinal sections of Figures 2 and 3. Letters $l$, $l'$, $w$, $w'$ are similarly used. The displacement of the centers of the diamonds is less than ½ $l$, producing a multi-flute cycle. The cross-section of Figure 10 indicates a surface composed of alternating wide arcs 31' and narrow arcs 31" with displaced centers.

In the arrangement shown in Figure 11, the diffusing pattern is made up of hexagonal areas indicated by the reference character 32. The cross-section shown in Figure 13 indicates a surface composed of alternate wide and narrow arcs 32' and 32" with displaced centers. These hexagonal bumps are the central portions, or frustums, of diamonds with long axis 2 $m$, and the mold is made the same way as in Figure 7, except for cutter profile and center profile cam. Asymmetric hexagons would result if the displacement were less than ½ $m$. The length of these hexagonal patterns is illustrated by the line $m$, the displacement of centers X equals ½ $m$.

The profiles of the bumps in Figures 1 to 13 are shown symmetric, but can readily be made asymmetric by using asymmetric cams for the cutter or an asymmetric cutter face.

The form shown in Figures 14 to 16 has lenticulations or diffusing elements 35 of reversed curve, or ogee profile, arranged side by side. These diffusing elements are produced by moving the cutter along a path of reverse curvature with opposite radii $r'$, $r''$, as illustrated by the reversely curved, or ogee, line forming the profile of Figure 15. The displacement of the summits X of the bumps is indicated at $n$, Figures 14 and 15. In the cross-section of Figure 16, the surface is made by alternate arcs 38, 39 of constant radii of curvature, but with displaced centers.

The characteristic of the family of diffusing elements shown in Figures 14 to 16 is that the intersections of the flutes are ogee curves which resemble pairs of oppositely facing parentheses marks. The diffusing pattern as shown in Figures 14 and 16 may be varied by changing the displacement or by selecting different values for $r'$, $r''$. Those may be equal or not as desired.

The arrangement shown in Figures 17 to 21 illustrates a conical refractor embodying a variation of the diffusing elements of Figures 14 to 16. There the adjacent flutes of toroidal contour and reverse curved profile were nested together with no intervening spaces. The arrangement of Figures 17 to 21, however, employs an arrangement according to which flutes 40, 40 similar to the flutes 35 of Figure 14 are alternated with rectilinear flutes 41. The flutes 40 have alternate wide and narrow portions, of varying depth, and vary in diffusing power lengthwise and crosswise in the same manner as a single flute 35 of Figure 14. The bulges are not offset as in Figures 14 and 16. The flutes 41 are of uniform radius of curvature, but vary in width owing to the spread of the flutes 40 and cutting out on account of the tapering shape of the refractor on which this diffusing formation is applied.

Figures 22 to 28 illustrate the application of diffusing pattern such as shown in Figures 1 to 6 on a generally hemispherical-shaped, street lighting refractor.

Figure 22 shows the dominant control in vertical planes in such a street lighting luminaire, light from the light source L is intercepted by reflector R and reflected downwardly in a beam of generally parallel rays to pass out through the upper part of the refractor R'. The reflected, and high angle direct light is emitted in an annular region above the line y—y. The refractor may be provided with vertical, lateral deviating prisms, as desired. Direct light at lower angles passes through the refractor R' below the line y—y.

Inasmuch as these refractors transmit large amounts of light flux for street lighting, the brightness of the refractor surfaces tends to be high. The diffusing elements discussed above are suitable for use to reduce this brightness and at the same time to provide a pleasing surface pattern or appearance to the refractor. Above the line y—y, where the light is sent toward remote street lighting areas, it is desirable to diffuse the light laterally a greater amount than it is diffused vertically. This is illustrated by the ellipse 50 showing the spread of light from a point on the surface of the refractor due to diffusion. The beam maintains the desired vertical and lateral dominant direction 52 and is not washed out by the limited diffusion obtained. Lower down on the refractor, where direct light is handled, the diffusion may well approximate the same amount in vertical and lateral direction as illustrated by the rounder beam outline 52.

When the diffusing pattern is to be applied to such a refractor (or an enclosing globe), a tier of depressions, all diamond-shaped or otherwise, and as nearly alike as possible, is cut into the zone of the mold, another tier of similar depressions cut into the next lower zone of the mold, there being a lesser number of them because of the narrowing of the mold, and this operation proceeds as far as desired, usually all the way to the bottom of the mold.

The refractor R', as more clearly shown in Figure 24, has an upper zone, above the line y—y and is provided with an overall pattern 53 of diffusing elements of diamond shape. The cutter for making the mold for the refractor is guided back and forth in vertical radial planes as above described. Where, however, the mold is annular, a rotary cutter may be employed, and bands of diamond-shaped elements cut into the mold. Owing to the narrowing of the mold, there is convergence of the centers of the diamonds forming a vertical flute. The lines separating the series of diamond-shaped elements therefore tend to spiral about the surface of mold, and the glass, as will be apparent from Figure 24. Between y—y and a lower point designated as z—z, the refractor is provided with a similar pattern 54 of diamond-shaped elements. In order to maintain approximately the same sized diamonds, the angular spacing between the diamonds is reduced. Between the two patterns is a transition zone where the diamonds are distorted. Below z—z, there is another region 55 of diamonds still lower in number. One size of cutter is used for cutting all the diffusing elements 53 above y—y, another size cutter for the elements 54 between y—y and z—z, and still different sized cutters for the families of diamond-shaped elements below z—z. As a result of the narrowing of the refractor toward the bottom and the change in angular spacing, the lines separating the various diamond-shaped areas tend to form spiral-like curves around the surface of the refractor as will be apparent from Figure 24.

The action of the elements in the upper region of the refractor (or enclosing globe) is illustrated in Figures 25 and 26 in which it will be seen that convergence of rays in the vertical plane 25—25 is much less than the angle of convergence of rays in the lateral plane 26—26. After the rays cross, they produce the elliptical beam illustrated at 50 in Figure 23. Here it is important to keep the vertical diffusion to a low figure so as not to dissolve the vertical concentration of the beam. The action in the lower part of the refractor (or enclosing globe) is such that in vertical planes as 27—27 the convergence is approximately the same as that in oblique plane 28—28. Here the diffusion is helpful in preventing striations on the road surface.

Figure 30 is an elevation and Figure 31 a plan view illustrating the action of the flutes on a street lighting luminaire mounted above the center of a street twice as wide as the mounting height, both in the region of a dominant ray 75° above the nadir (on the right) and in the region of a lower dominant ray at 50° from nadir (on the left). The dominant, 75° ray is indicated at 60, the upper and lower rays of 5° spread at 61 and 62, the upper and lower rays of 10° spread at 63 and 64 and the lateral rays of 10° spread at 65, 66 and the lateral rays of 25° spread at 67, 68. The 50° ray is indicated at 70, the upper and lower rays of 20° spread at 71 and 72, the upper and lower rays of 20° spread at 73, 74, the lateral rays of 10° spread at 75, 76 and the lateral rays of 25° spread at 77, 78.

The approximately diamond shaped areas of street surface receiving light from a lenticulation are indicated by dotted asymmetric diamonds.

Lengthwise of the street is a series of diamond shaped areas of varying configuration onto which the series of vertical lenticulations direct light, and crosswise, another series of diamond shaped areas of like configuration, as indicated by the arcs 79 and 80, so that every point on the street receives light from a multiplicity of lenticulations above and below one another and side by side. Conversely, from any point on the street the eye receives light from many separate lenticulations, thereby providing a large luminous area on the globe in the field of view. This is accomplished without interfering substantially with the direction of the dominant light flux.

It will also be seen that the width of the street surface onto which a lenticular region sends downwardly sloping light varies with the tangent which the median ray makes with the vertical and the sine of one half of the lateral angle of spread produced by the lenticulation, that the length of the street surface onto which the lenticulation sends lowered light varies with the difference between the tangent of the angle to the vertical of the median ray and the tangent of the angle to the vertical of the highest ray, and that a relatively uniform brightness appears to the viewer at the street level within the region receiving light from a superficial area of the refractor.

The amount of lateral spread which can be obtained by such diffusing elements may range from 10° to 25° in Figures 26 and 28 with a reasonable average of 20°. The vertical spread can range between 5° and 10°, with an average of 8° at the top of the refractor, while the vertical spread in the lower part of the refractor will be from 10° to 20°. In a circular bowl of 13-inch flange diameter, one can cut 135 flutes 2° 40' wide, and the diamonds at the top may have a maximum width of slightly less than .3 inch. Lower down, such a refractor (or globe) could have 90 flutes 4° wide, etc. Similar flutes could be placed on cylindrical-conical globes or on those of elliptical or quasi-elliptical shape.

The foregoing discussion is all directed toward mold made devices, wherein the lenticulations are of convex contour because of the readiness with which such surfaces may be made in the molding equipment. Where, however, the figuration is made in the light transmitter by machining it, the lenticulations would have concave toroidal contour instead, as indicated in Figure 29.

Since it is obvious that the invention may be embodied in other forms and constructions within the scope of the claims, I wish it to be understood that the particular forms shown are but several of these forms, and various

What is claimed is:

1. Means for diffusely transmitting light rays with maximum and minimum diffusion angles in planes at right angles to one another, comprising a transparent light transmitting member having on one surface thereof a series of contiguous flutes lying along the traces of adjacent normally vertical planes intersecting said surface and normal thereto, said flutes each being of alternately maximum and minimum width to accept varying widths of light beam and being nested and in contact with one another to form a lenticulated area which intercepts a vertical band of light, the lenticulations thereof each having transversely thereof a uniform arcuate profile and longitudinally thereof a profile made up of curves of greater radius to provide toroidal surface elements elongated in normally vertical directions whereby the lenticulations have relatively narrow acceptance angles and relatively large diffusion power in transverse directions as well as relatively wide lengthwise acceptance angles and smaller diffusion power, and along any line crossing a lenticulated region the maximum acceptance angle in one lenticulation is between lesser acceptance angles of the adjacent lenticulations.

2. Means for diffusely transmitting light rays as claimed in claim 1, wherein the lenticulations are diamonds.

3. Means for diffusely transmitting light rays as claimed in claim 1, wherein the lenticulations are defined by a series of ogee curves.

4. Means for diffusely transmitting light rays as claimed in claim 1, wherein the lenticulations are on the outside of a downwardly converging globe, the lenticulations in the upper portion of the globe having vertical radii of curvature to produce a vertical spread of from about 5° to about 10°, and those in the lower portion of the globe having vertical radii of curvature to produce a vertical spread of from about 10° to about 20°, and wherein the horizontal radii of curvature of the upper and lower lenticulations are such as to produce a lateral spread between about 10° and about 25°.

References Cited in the file of this patent

UNITED STATES PATENTS

| | | |
|---|---|---|
| D. 19,644 | Pilkington | Feb. 11, 1890 |
| D. 91,100 | Cole | Nov. 28, 1933 |
| D. 164,564 | Franck | Sept. 18, 1951 |
| 627,848 | Fugman | June 27, 1899 |
| 944,348 | Schrader | Dec. 28, 1909 |
| 1,092,114 | Mygatt | Mar. 31, 1914 |
| 1,277,065 | Gundlach | Aug. 27, 1918 |
| 1,761,654 | Cole | June 3, 1930 |
| 1,970,358 | Bull et al. | Aug. 14, 1934 |
| 2,099,034 | Rolph | Nov. 16, 1937 |
| 2,486,558 | Franck | Nov. 1, 1949 |
| 2,702,850 | Harling | Feb. 22, 1955 |

FOREIGN PATENTS

| | | |
|---|---|---|
| 12,884 | Great Britain | of 1896 |
| 8,183 | Great Britain | of 1909 |
| 10,812 | Great Britain | July 22, 1915 |
| 729,415 | France | July 23, 1932 |